(12) United States Patent
Soma

(10) Patent No.: US 11,356,575 B2
(45) Date of Patent: Jun. 7, 2022

(54) PRINTING APPARATUS

(71) Applicant: BROTHER KOGYO KABUSHIKI KAISHA, Nagoya (JP)

(72) Inventor: Munetoshi Soma, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/206,142

(22) Filed: Mar. 19, 2021

(65) Prior Publication Data

US 2021/0377414 A1  Dec. 2, 2021

(30) Foreign Application Priority Data

May 29, 2020  (JP) .............................. JP2020-094066

(51) Int. Cl.
 *H04N 1/00*  (2006.01)
(52) U.S. Cl.
 CPC .............................. *H04N 1/00888* (2013.01)
(58) Field of Classification Search
 None
 See application file for complete search history.

(56) References Cited

U.S. PATENT DOCUMENTS

2019/0196565 A1* 6/2019 Shimamura ............. G06F 1/263
2019/0199884 A1* 6/2019 Shimamura ........ H04N 1/00888
2019/0238706 A1* 8/2019 Sakai ................. H04N 1/00907

FOREIGN PATENT DOCUMENTS

JP  2019-97107 A  6/2019

\* cited by examiner

*Primary Examiner* — Dov Popovici
(74) *Attorney, Agent, or Firm* — Kenealy Vaidya LLP

(57) ABSTRACT

A printing apparatus connectable to an external power supply having a plurality of outputtable electric power information, including: a printing head performing printing by electric power supplied from the external power supply; and a controller configured to: obtain the plurality of electric power information; determine whether the printing can be performed if electric power indicated by the obtained electric power information is supplied from the external power supply; decide, as request electric power information, any one of the electric power information indicating possible electric powers; request the external power supply to output electric power indicated by the request electric power information; calculate a print control value for controlling the printing head based on the decided request electric power information; and control the printing head to perform the printing based on the calculated print control value.

14 Claims, 6 Drawing Sheets

FIG. 3

| No. | VOLTAGE | CURRENT | ELECTRIC POWER | REMARKS |
|---|---|---|---|---|
| 1 | 5V | 500mA | 2.5W | USB 2.0 |
| 2 | 5V | 1.5A | 7.5W | USB BC1.2 |
| 3 | 5V | 3A | 15W | |
| 4 | 9V | 3A | 27W | |
| 5 | 15V | 3A | 45W | |
| 6 | 18V | 3A | 54W | NON-USB PD STANDARDS |
| 7 | 20V | 3A | 60W | |
| 8 | 20V | 5A | 100W | ASSUMED ELECTRIC POWER INFORMATION |

FIG. 4

| No. | VOLTAGE | CURRENT | ELECTRIC POWER | CHARGING CURRENT | WHETHER PRINTING CAN BE PERFORMED | PRINTING SPEED | ENERGIZATION TIME | NUMBER OF DIVISIONS |
|---|---|---|---|---|---|---|---|---|
| 1 | 5V | 500mA | 2.5W | 500mA | PRINTING IS NOT POSSIBLE | — | — | — |
| 2 | 5V | 1.5A | 7.5W | 1.5A | | | | |
| 3 | 5V | 3A | 15W | 3A | | | | |
| 4 | 9V | 3A | 27W | | | | | |
| 5 | 15V | 3A | 45W | | PRINTING IS POSSIBLE | 45mm/s | 1.33ms | 2 |
| 6 | 18V | 3A | 54W | | | 54mm/s | 1.11ms | 1 |
| 7 | 20V | 3A | 60W | | | 60mm/s | 1ms | 1 |
| 8 | 20V | 5A | 100W | | | 100mm/s | 1ms | 1 |

PRINTING APPARATUS

CROSS-REFERENCE TO RELATED APPLICATIONS

This application is based on and claims priority under 35 USC 119 from Japanese Patent Application No. 2020-094066 filed on May 29, 2020, the contents of which are incorporated herein by reference.

TECHNICAL FIELD

The present disclosure relates to a printing apparatus.

BACKGROUND

A related-art multi-function printer is connected to an electric power supplying device via a cable in conformity to USB PD (USB Power Delivery) standards, and receives suppliable electric power. The multi-function printer includes an IF control unit, an electric power managing unit, a ROM, and the like. The IF control unit performs negotiation with the electric power supplying device, and obtains a profile indicating the suppliable electric power from the electric power supplying device. The electric power managing unit decides, based on an operation mode table, an execution mode that is an operation mode for executing a job (processing) such as print. The operation mode table is stored in the ROM, and indicates a correspondence between an electric power supplying state of the multi-function printer and operation modes. Each operation mode is classified roughly according to the power consumption consumed to execute the job. The electric power managing unit decides, as an execution mode, an operation mode whose power consumption does not exceed the suppliable electric power indicated by the profile in the operation mode table.

SUMMARY

One illustrative aspect of the present disclosure may provide a printing apparatus connectable to an external power supply, the external power supply having a plurality of electric power information each indicating electric power that can be output, the printing apparatus including: a printing head configured to perform printing on a printing medium by electric power that is supplied from the external power supply; and a controller configured to: obtain the plurality of electric power information of the external power supply; determine whether the printing by the printing head can be performed on a condition that electric power indicated by the obtained electric power information is supplied from the external power supply; decide, as request electric power information, any one of the electric power information indicating possible electric powers, the possible electric powers being determined in the determining that the printing by the printing head can be performed; request the external power supply to output electric power indicated by the request electric power information; calculate a print control value based on the decided request electric power information, the print control value being for controlling the printing head on a condition that the electric power indicated by the request electric power information is supplied from the external power supply; and control the printing head to perform the printing based on the calculated print control value.

According to the above configuration, the printing apparatus calculates the print control value corresponding to the request electric power information indicative of the electric power received from the external power supply. For this reason, the printing apparatus can perform printing by sufficiently using the electric power received from the external power supply.

BRIEF DESCRIPTION OF DRAWINGS

Illustrative aspects of the invention will be described in detail with reference to the following figures wherein:

FIG. 3 depicts electric power information of an external power supply;

FIG. 4 depicts a calculation result of print control values when electric power indicated by the electric power information is received;

DETAILED DESCRIPTION

Figure 1:
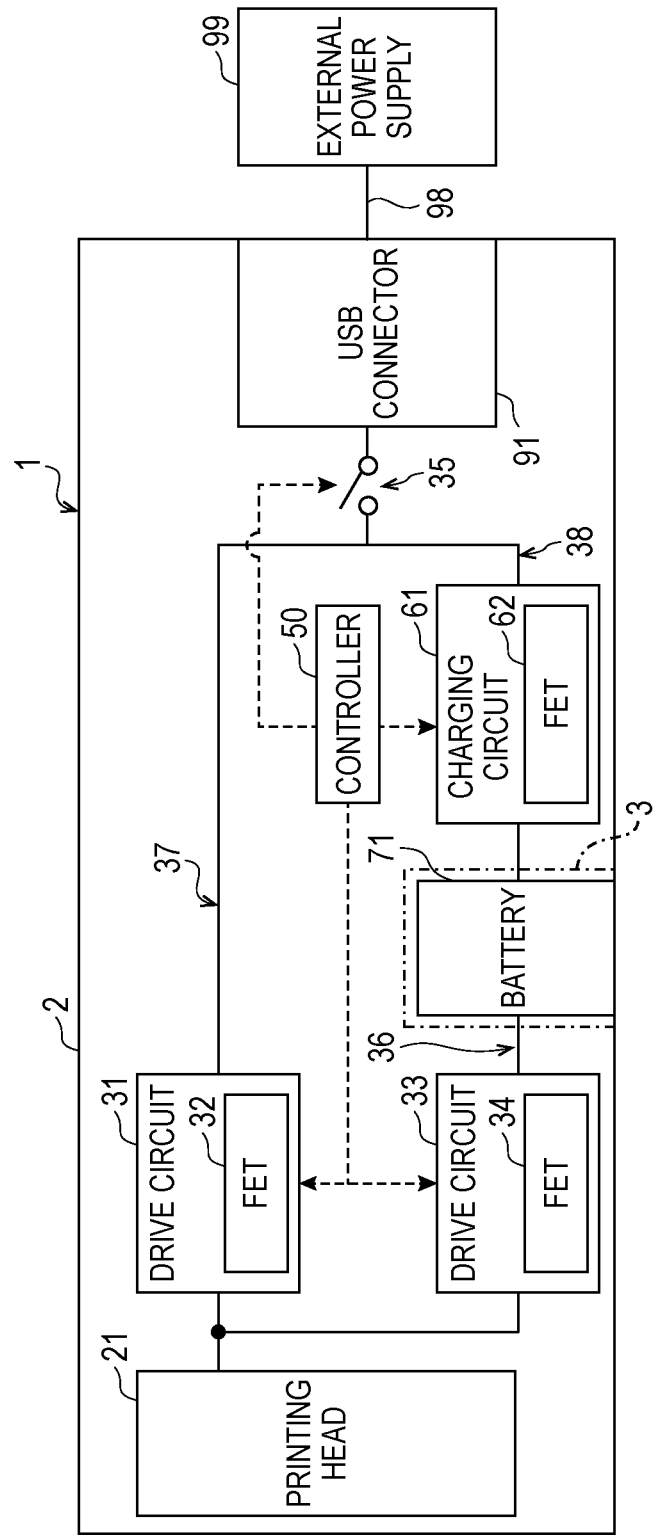
FIG. 1 depicts an electric system of a printing apparatus.

In the related-art multi-function printer, since each operation mode is classified roughly according to the power consumption consumed to execute the job, there is a margin between the power consumption of the execution mode that is decided by the electric power managing unit and the suppliable electric power. There is a problem that the related-art multi-function printer is unable to execute the job such as print by sufficiently using the suppliable electric power received from the external power supply, due to a difference between the suppliable electric power and the power consumption.

Therefore, illustrative aspects of the present disclosure provide a printing apparatus capable of performing printing by sufficiently using electric power received from an external power supply.

Hereinbelow, an illustrative embodiment of the present disclosure will be described with reference to the drawings. The accompanying drawings are used so as to describe technical features that can be adopted by the present disclosure. A configuration of an apparatus shown in the drawings is not intended to be limited thereto, and is merely an example of description.

A printing apparatus 1 is a thermal transfer-type printer configured to drive by electric power that is supplied from any one of an external power supply 99 and a battery 71. The printing apparatus 1 can print a character (an object such as a letter, a symbol, a number, a figure and the like) on a printing medium (for example, a heat sensitive label).

A configuration of the printing apparatus 1 is described with reference to FIG. 1. The printing apparatus 1 has a housing 2. A surface of the housing 2 is provided with an input interface 5 (refer to FIG. 2), a display 6 (refer to FIG. 2), and a USB (abbreviation of Universal Serial Bus) connector 91. The input interface 5 can receive a user's operation. The display 6 is a liquid crystal monitor configured to display a variety of information. The USB connector 91 is a connection port for connection to a USB device such as an external power supply 99 via a cable 98 conforming to Universal Serial Bus Power Delivery (USB PD) standards.

The external power supply 99 is, for example, a general purpose personal computer, a mobile terminal, a tablet terminal or the like. The external power supply 99 has a plurality of electric power information (refer to FIG. 3) based on power rules in the USB PD standards. Each of the electric power information indicates a combination of predetermined voltage, current and electric power that can be output by the external power supply 99. The external power supply 99 can output electric power indicated by any one of the plurality of electric power information to the printing apparatus 1. The USB connector 91 is configured to relay the electric power that is supplied from the external power supply 99.

In the housing 2, a controller 50, a mounting part 3, a conveying motor 11 (refer to FIG. 2), a printing head 21, a first line 36, a second line 37, a third line 38, drive circuits 31 and 33, a charging circuit 61 and the like are provided. The controller 50 is configured to collectively control the printing apparatus 1. The battery 71 can be detachably mounted to the mounting part 3. The battery 71 is, for example, a lithium ion battery or an electric double layer capacitor. The conveying motor 11 is configured to convey a printing medium toward the printing head 21. The printing head 21 has a plurality of heat generating elements (not shown) aligned in a direction orthogonal to a conveying direction of the printing medium. The printing head 21 is configured to perform printing on the conveyed printing medium as the heat generating elements are energized and generate heat according to dot pattern data to be printed.

The first line 36 is connected to the battery 71 mounted to the mounting part 3 and to the printing head 21. The first line 36 transmits electric power discharged from the battery 71 to the printing head 21. The first line 36 is provided with the drive circuit 33. The drive circuit 33 is an electronic circuit for controlling drive of the printing head 21. The drive circuit 33 has a FET (abbreviation of Field Effect Transistor) 34 that is a switching element. The FET 34 is switched to an ON state and an OFF state, in response to an instruction output from the controller 50. When the FET 34 is in the ON state, the first line 36 transmits electric power from the battery 71 to the printing head 21. When the FET 34 is in the OFF state, the first line 36 stops transmission of electric power from the battery 71 to the printing head 21.

The third line 38 is connected to the battery 71 mounted to the mounting part 3 and to the USB connector 91. The third line 38 transmits power supply electric power, which is relayed by the USB connector 91, to the battery 71 mounted to the mounting part 3. The third line 38 is provided with the charging circuit 61. The charging circuit 61 is an electronic circuit for controlling charging to the battery 71. The charging circuit 61 has a FET 62 that is a switching element. The FET 62 is switched to an ON state and an OFF state, in response to an instruction output from the controller 50. When the FET 62 is in the ON state, the third line 38 transmits electric power from the USB connector 91 to the battery 71. When the FET 62 is in the OFF state, the third line 38 stops transmission of electric power from the USB connector 91 to the battery 71.

The second line 37 is directly connected to the printing head 21 and the USB connector 91. The second line 37 transmits power supply electric power, which is relayed by the USB connector 91, to the printing head 21. The second line 37 is provided with the drive circuit 31. Similar to the drive circuit 33, the drive circuit 31 is an electronic circuit for controlling drive of the printing head 21. The drive circuit 31 has a FET 32 that is a switching element. The FET 32 is switched to an ON state and an OFF state, in response to an instruction output from the controller 50. When the FET 32 is in the ON state, the second line 37 transmits electric power from the USB connector 91 to the printing head 21. When the FET 32 is in the OFF state, the second line 37 stops transmission of electric power from the USB connector 91 to the printing head 21.

The second line 37 and the third line 38 are provided with a switch 35. The switch 35 is switched to an ON state and an OFF state, in response to an instruction output from the controller 50. When the switch 35 is in the ON state, the electric power that is relayed by the USB connector 91 is transmitted to the drive circuit 31 and the charging circuit 61. When the switch 35 is in the OFF state, transmission of electric power, which is relayed by the USB connector 91, to the drive circuit 31 and the charging circuit 61 is stopped.

Figure 2:
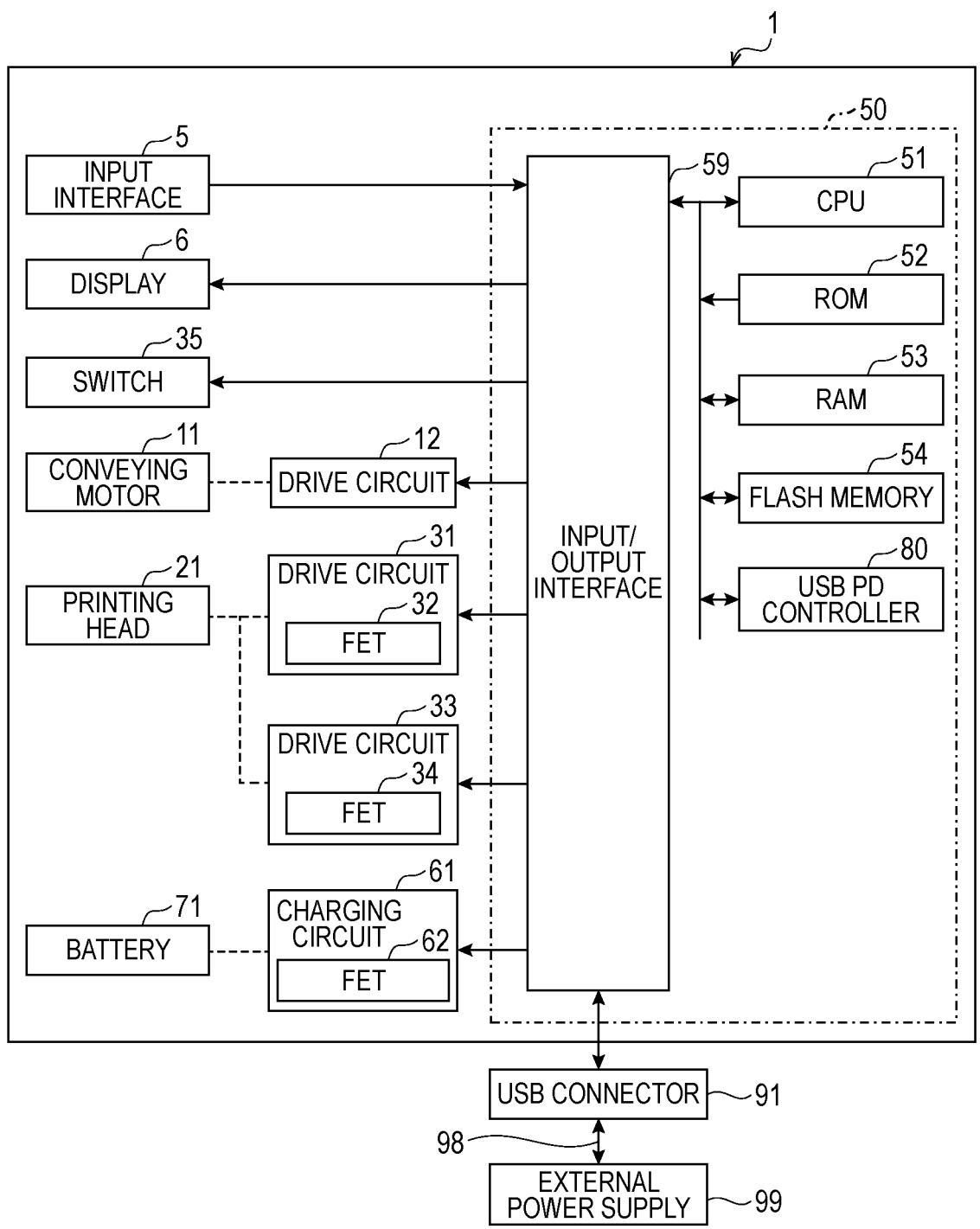
FIG. 2 is a block diagram depicting an electrical configuration of the printing apparatus.

An electrical configuration of the printing apparatus 1 is described with reference to FIG. 2. The controller 50 includes a CPU (abbreviation of Central Processing Unit) 51, a ROM (abbreviation of Read Only Memory) 52, a RAM (abbreviation of Random Access Memory) 53, a flash memory 54, a USB PD controller 80, and an input/output interface (hereinbelow, referred to as the input/output I/F) 59. The ROM 52, the RAM 53, the flash memory 54, the USB PD controller 80, and the input/output I/F (abbreviation of interface) 59 are each electrically connected to the CPU 51.

The CPU 51 is configured to execute a variety of programs for controlling the printing apparatus 1. In the ROM 52, a variety of programs, a dot pattern of a character to be printed, assumed electric power information (which will be described later), and the like are stored. In the RAM 53, a flag, a counter, a calculation result, and the like are temporarily stored. In the flash memory 54, a variety of settings and the like of the printing apparatus 1 are stored. The USB PD controller 80 is configured to control the switch 35 and to perform communication with the external power supply 99, in response to an instruction output from the CPU 51.

The CPU 51 is electrically connected to the input interface 5, the display 6, the switch 35, the drive circuits 12, 31 and 33, the charging circuit 61 and the USB connector 91 via the input/output I/F 59. The drive circuit 12 is electrically connected to the conveying motor 11. The CPU 51 is configured to control the drive circuit 12, thereby controlling conveying of the printing medium by the conveying motor 11. The input interface 5 is configured to input a receiving result of a user's operation to the CPU 51. The display 6 is configured to display a variety of information, in response to an instruction output from the CPU 51. The CPU 51 is configured to control the charging circuit 61, thereby controlling charging to the battery 71. The printing apparatus 1 does not perform charging to the battery 71 and printing by the printing head 21 at the same time. When charging the battery 71, the CPU 51 switches the FET 62 to the ON state and the FETs 32 and 34 to the OFF state.

The CPU 51 is configured to control the drive circuits 31 and 33, thereby controlling transmission of electric power by the first line 36 and the second line 37. When connected to the external power supply 99, the printing apparatus 1 performs printing by the electric power that is supplied from the external power supply 99, and when not connected to the external power supply 99, the printing apparatus 1 performs printing by the electric power that is supplied from the battery 71.

The external power supply 99 is electrically connected to the USB PD controller 80 via the USB connector 91 and the input/output I/F 59. The CPU 51 is configured to perform communication with the external power supply 99 via the USB PD controller 80. The CPU 51 is configured to obtain the plurality of electric power information of the external power supply 99.

The electric power information of the external power supply 99 is described with reference to FIG. 3. The external power supply 99 has eight electric power information, in each of which an electric power information number, a voltage, a current, and an electric power are associated. The electric power information of the electric power information No. 1 conforms to USB 2.0 standards. The electric power information of the electric power information No. 2 conforms to USB BC (Battery Charging) 1.2 standards. The electric power information of the electric power information No. 6 is non-standard electric power information with respect to power rules in the USB PD standards. The CPU 51 is configured to decide any one of the plurality of electric power information, and to request the external power supply 99 to output electric power indicated by the decided electric power information.

The control during printing, which is executed when the electric power is received from the external power supply 99, is described with reference to FIG. 4. During printing, the CPU 51 controls a printing speed, an energization time, and a number of divisions of the printing head 21, according to the received electric power. In the below, the parameters for controlling the printing head 21 during printing, such as a printing speed, an energization time, a number of divisions and the like are collectively referred to as 'print control value'. The energization time and the number of divisions are print control values relating to a heat generation region of the printing head 21. The heat generation region refers to a region having a plurality of heat generating elements aligned in a direction orthogonal to a conveying direction during printing.

The printing apparatus 1 conveys the printing medium at a printing speed by drive of the conveying motor 11, and controls the printing head 21 according to the printing speed, thereby energizing the heat generation region to perform printing on the printing medium. The printing apparatus 1 may perform printing of one line by dividing the heat generation region and performing the energization for each of the heat generation regions, in some cases. The energization time is a time necessary to energize the heat generating elements in the heat generation region for printing. The number of divisions is a number of divisions of the heat generation region when printing one line. That is, the time required to print one line is derived by multiplying the energization time and the number of divisions. When the number of divisions is large, the number of the heat generating elements in the heat generation region decreases, so that a magnitude of the current energized in the printing head 21 is reduced.

In the ROM 52, assumed electric power information, and a printing speed (reference printing speed), an energization time (reference energization time) and a number of divisions (reference number of divisions) when electric power indicated by the assumed electric power information is received from the external power supply 99 are stored. The assumed electric power information refers to information of a combination of a voltage, a current, and an electric power that are assumed required when executing printing with the predetermined print control values by the printing head 21, and is 20V/5 A/100 W, in the present illustrative embodiment. In the present illustrative embodiment, the reference printing speed is 100 mm/s, the energization time is 1 ms, and the reference number of divisions is 1. Note that, the printing apparatus 1 does not receive the voltage, the current, and the electric power, which exceed any one of the voltage, the current, and the electric power indicated by the assumed electric power information.

The CPU 51 decides, as request electric power information, one of the plurality of electric power information of the external power supply 99, and requests the external power supply 99 to output electric power indicated by the request electric power information. The CPU 51 calculates the print control values, based on a relation between the decided request electric power information and the assumed electric power information stored in the ROM 52. The printing speed, the energization time, and the number of divisions when the electric power indicated by the request electric power information is received are each calculated by following equations (1), (2) and (3). The printing speed when the electric power indicated by the request electric power information is received is derived by multiplying a ratio of the electric power indicated by the request electric power information to the electric power indicated by the assumed electric power information and the reference printing speed. The energization time when the electric power indicated by the request electric power information is received is derived by multiplying a ratio of a voltage indicated by the request electric power information to a voltage indicated by the assumed electric power information and the reference energization time. The number of divisions when the electric power indicated by the request electric power information is received is derived as an integer part (a floor function) of a ratio of the electric power indicated by the assumed electric power information to the electric power indicated by the request electric power information.

$$\text{printing speed} = (\text{reference printing speed}) \times \frac{\text{electric power in request electric power information}}{\text{electric power in assumed electric power information}} \quad \text{Equation (1)}$$

$$\text{energization time} = (\text{reference energization time}) \times \frac{\text{voltage in request electric power information}}{\text{voltage in assumed electric power information}} \quad \text{Equation (2)}$$

$$\text{number of divisions} = \frac{\text{electric power in assumed electric power information}}{\text{electric power in request electric power information}} \quad \text{Equation (3)}$$

For example, when the electric power indicated by the electric power information (15V/3 A/45 W) of the electric power information No. 5 as the request electric power is received from the external power supply 99, the printing speed is 45 mm/s according to the equation (1), the energization time is about 1.3 s according to the equation (2), and the number of divisions is 2 according to the equation (3). Note that, when the electric power less than 45 W is received, the CPU 51 does not perform printing by the printing head 21.

The charging control on the battery 71 when the electric power is received from the external power supply 99 is described. When the external power supply 99 is connected to the printing apparatus 1, the CPU 51 controls the current that is charged in the battery 71, based on the electric power information of the external power supply 99. When the electric power indicated by the electric power information having the largest electric power among the electric power information of the external power supply 99 is 15 W or greater, the CPU 51 controls the charging circuit 61 to charge the battery 71 with the current of 3 A. When the electric power indicated by the electric power information having the largest electric power among the electric power information of the external power supply 99 is equal to or greater than 7.5 W and less than 15 W, the CPU 51 controls the charging circuit 61 to charge the battery 71 with the current of 1.5 A. When the electric power indicated by the electric power information having the largest electric power among the electric power information of the external power supply 99 is equal to or greater than 2.5 W and less than 7.5 W, the CPU 51 controls the charging circuit 61 to charge the battery 71 with the current of 500 mA.

Main processing that is executed by the CPU 51 is described with reference to FIGS. 5 and 6. In the main processing, the CPU 51 decides the request electric power information, receives the electric power indicated by the request electric power information from the external power supply 99, and executes the charging of the battery 71 or the printing by the printing head 21. Upon start of the main processing, the FETs 32, 34 and 62 and the switch 35 are all in the OFF state. When the USB connector 91 is connected to the external power supply 99, the CPU 51 reads out a program stored in the ROM 52, and executes the main processing.

Figure 5:
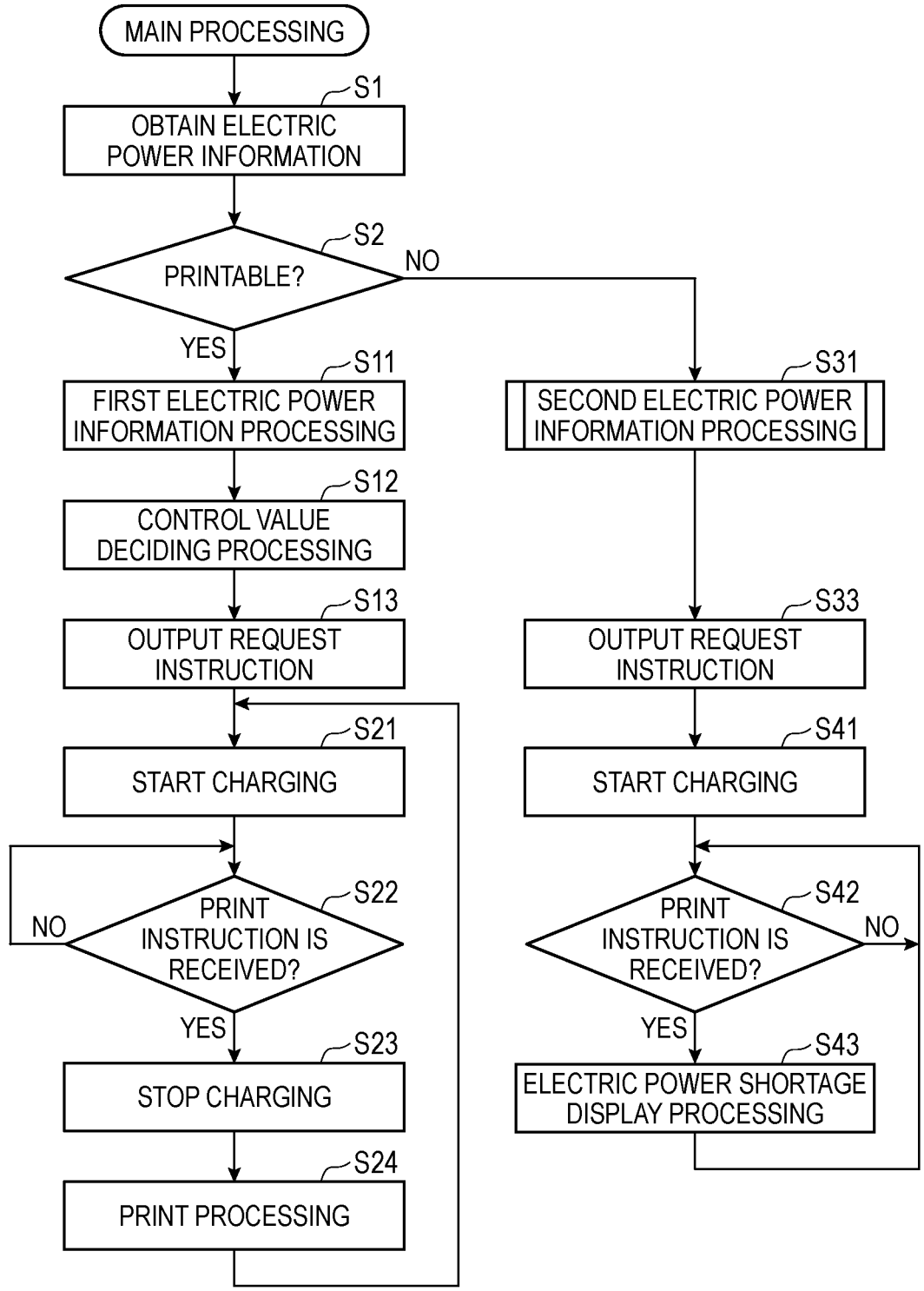
FIG. 5 is a flowchart of main processing.
Figure 6:
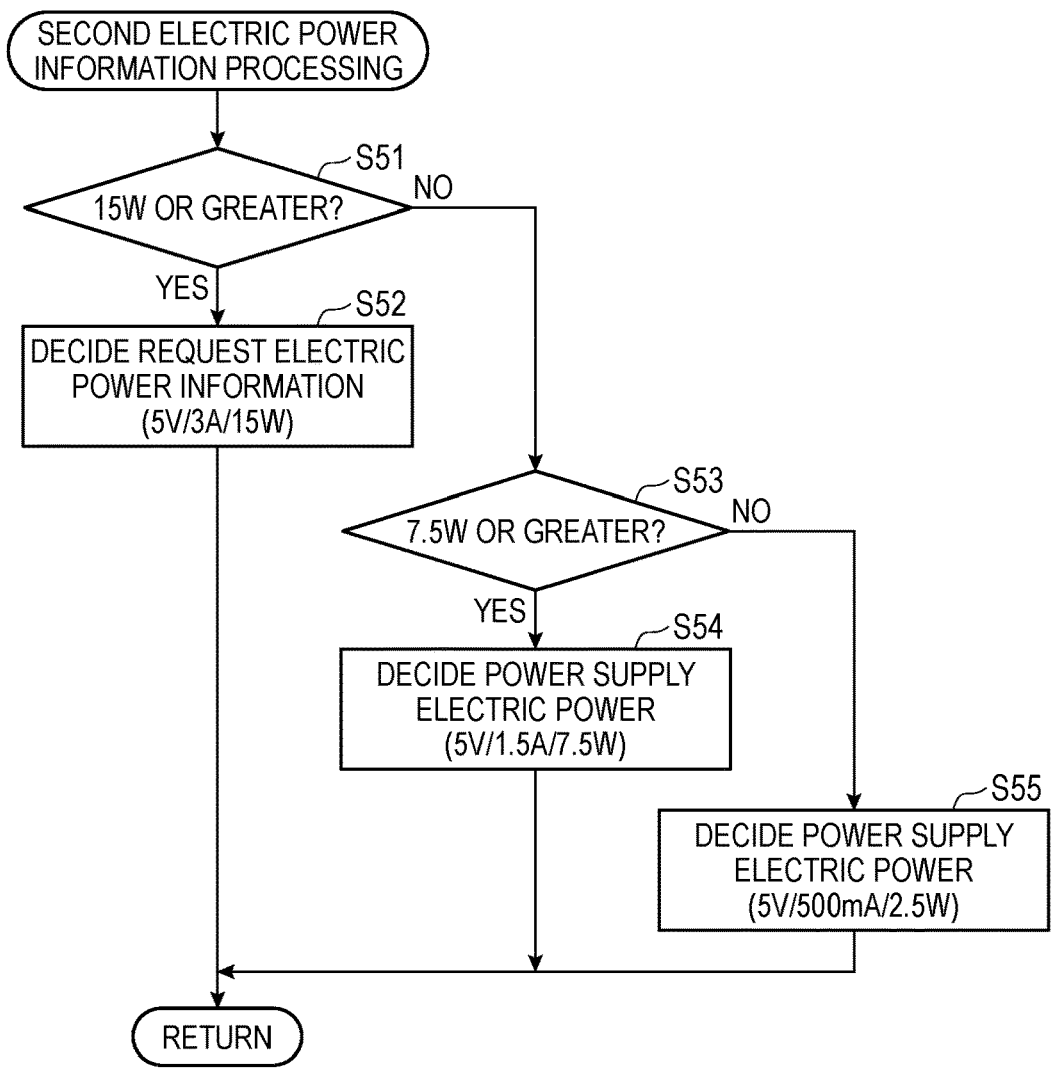
FIG. 6 is a flowchart of second electric power information processing.

As shown in FIG. 5, the CPU 51 obtains the plurality of electric power information of the external power supply 99 via the USB PD controller 80 (S1). The CPU 51 determines whether printing can be performed with the electric powers indicated by the obtained electric power information (S2). In the determination of S2, when the obtained electric power information includes the electric power information indicative of the electric power of 45 W or greater, the CPU 51 determines that printing can be performed with the electric power that is received from the external power supply 99, and when there is no electric power information indicative of the electric power of 45 W or greater, the CPU 51 determines that printing cannot be performed with the electric power that is received from the external power supply 99.

When it is determined that the obtained electric power information includes the electric power information of 45 W or greater and printing can be performed (S2: YES), the CPU 51 executes first electric power information processing (S11). In the first electric power information processing, the CPU 51 decides, as the request electric power information, the electric power information, which indicates the voltage (20V), current (5 A) and electric power (100 W) or less of the assumed electric power information and the maximum electric power, of the electric power information obtained in S1.

The CPU 51 executes control value deciding processing (S12). In the control value deciding processing, the CPU 51 calculates the print control values from the equations (1), (2) and (3), based on the decided request electric power information and the assumed electric power information. The CPU 51 outputs a request instruction to the external power supply 99 so as to output the electric power indicated by the decided request electric power information (S13). The external power supply 99 that receives the request instruction from the printing apparatus 1 outputs the electric power indicated by the request electric power information to the printing apparatus 1.

The CPU 51 switches the switch 35 and the FET 62 to the ON state to start charging the battery 71 (S21). The CPU 51 determines whether a print instruction is received from the input interface 5 (S22). When performing printing by the printing head 21, the user operates the input interface 5. The input interface 5 outputs the print instruction to the CPU 51. When it is determined that the print instruction is not received (S22: NO), the CPU 51 waits for the processing.

When it is determined that the print instruction is received (S22: YES), the CPU 51 switches the FET 62 to the OFF state to stop the charging of the battery 71 (S23). The CPU 51 executes print processing (S24). In the print processing, the CPU 51 switches the FET 32 to the ON state. The transmission of electric power by the second line 37 starts, so that the electric power is supplied from the external power supply 99 to the printing head 21. The CPU 51 controls the drive of the printing head 21, based on the print control values derived in the control value deciding processing (S12), and performs printing on the printing medium. After executing the print processing, the CPU 51 returns the processing to S21.

On the other hand, when the obtained electric power information does not include the electric power information of 45 W or greater and the printing cannot be performed (S2: NO), the CPU 51 executes second electric power information processing (S31).

The second electric power information processing (S31, refer to FIG. 5) that is executed in the main processing is described with reference to FIG. 6. In the second electric power information processing, the CPU 51 decides the request electric power information, based on the electric power information obtained in S1 (refer to FIG. 5).

When the second electric power information processing starts, the CPU 51 determines whether the electric power information indicating the electric power of 15 W or greater is included in the electric power information obtained in S1 (S51). When it is determined that the electric power information indicating the electric power of 15 W or greater is included in the obtained electric power information (S51: YES), the CPU 51 decides, as the request electric power information, the electric power information (5V/3 A/15 W), which indicates the minimum voltage (5V based on USB power supplying standards) and the maximum electric power, of the obtained electric power information (S52). The CPU 51 returns the processing to the main processing.

When it is determined that the electric power information indicating the electric power of 15 W or greater is not included in the obtained electric power information (S51: YES), the CPU 51 determines whether the electric power information indicating the electric power of 7.5 W or greater is included in the obtained electric power information (S53). When it is determined that the electric power information indicating the electric power of 7.5 W or greater is included in the obtained electric power information (S53: YES), the CPU 51 decides, as the request electric power information, the electric power information (5V/1.5 A/7.5 W), which indicates the minimum voltage and the maximum electric power, of the obtained electric power information (S54). The CPU 51 returns the processing to the main processing. The request electric power information decided in S54 conforms to USB BC 1.2 standards.

When it is determined that the electric power information indicating the electric power of 7.5 W or greater is not included in the obtained electric power information (S53: NO), the CPU 51 decides, as the request electric power information, the electric power information (5V/500 mA/2.5

W) conforming to USB 2.0 standards of the obtained electric power information (S55). The CPU 51 returns the processing to the main processing.

Returning to the descriptions of FIG. 5, after executing the second electric power information processing (S31), the CPU 51 outputs a request instruction to the external power supply 99 so as to output the electric power indicated by the decided request electric power information (S33). The processing of S33 is similar to the processing of S13.

The CPU 51 switches the switch 35 and the FET 62 to the ON state to start charging the battery 71 (S41). The processing of S41 is similar to the processing of S21. The CPU 51 determines whether a print instruction is received from the input interface 5 (S42). The processing of S42 is similar to the processing of S22. When it is determined that the print instruction is not received (S42: NO), the CPU 51 waits for the processing. When it is determined that the print instruction is received (S42: YES), the CPU 51 executes electric power shortage display processing (S43). In the electric power shortage display processing, the CPU 51 displays and notifies that the printing by the printing head 21 cannot be performed, on the display 6. After executing the electric power shortage display processing, the CPU 51 returns the processing to S42.

As described above, the printing apparatus 1 is connected to the external power supply 99 having the plurality of electric power information. The printing apparatus 1 includes the controller 50 having the CPU 51, and the printing head 21. When the external power supply 99 is connected to the printing apparatus 1, the CPU 51 obtains the plurality of electric power information of the external power supply 99 (S1). The CPU 51 determines whether printing can be performed with the electric power indicated by the obtained electric power information (S2). When it is determined that printing can be performed (S2: YES), the CPU 51 executes the first electric power information processing to decide the request electric power information (S11). The CPU 51 executes the control value deciding processing, and calculates the print control values based on the decided request electric power information (S12). The CPU 51 outputs the request instruction to the external power supply 99 so as to output the electric power indicated by the decided request electric power information (S13). The CPU 51 executes the print processing to control the drive of the printing head 21 based on the calculated print control values, and to perform printing on the printing medium (S24).

In this way, the printing apparatus 1 calculates the print control values corresponding to the request electric power information, and controls the drive of the printing head 21 to perform printing, based on the print control values. For this reason, the printing apparatus 1 can perform printing by sufficiently using the electric power that is received from the external power supply 99.

The printing apparatus 1 includes the ROM 52 in which the assumed electric power information is stored. The CPU 51 calculates the printing speed, which is one of the print control values when the electric power indicated by the request electric power information is received, based on the ratio of the electric power indicated by the request electric power information to the electric power indicated by the assumed electric power information. In this way, the printing apparatus 1 calculates the print control value corresponding to the request electric power information, based on the ratio of the electric power indicated by the request electric power information to the electric power indicated by the assumed electric power information. For this reason, the printing apparatus 1 can perform printing by sufficiently using the electric power that is received from the external power supply 99.

When it is determined that printing can be performed with the electric powers indicated by the obtained electric power information, the CPU 51 decides, as the request electric power information, the electric power information, which indicates the electric power or less of the assumed electric power information and the maximum electric power, in the first electric power information processing. There is an upper limit on the electric power that can be output at a time by the external power supply 99. The printing apparatus 1 does not receive electric power greater than the electric power of the assumed electric power information. Therefore, when the external power supply 99 is connected to the printing apparatus 1 and a device other than the printing apparatus 1, a situation where the electric power that is output to the printing apparatus 1 increases and thus the electric power that is output to the device other than the printing apparatus 1 decreases is suppressed.

The CPU 51 calculates the energization time, which is one of the print control values when the electric power indicated by the request electric power information is received, based on the ratio of the voltage indicated by the request electric power information to the voltage indicated by the assumed electric power information. In this way, the printing apparatus 1 calculates the print control value corresponding to the request electric power information, based on the ratio of the voltage indicated by the request electric power information to the voltage indicated by the assumed electric power information. For this reason, the printing apparatus 1 can perform printing by sufficiently using the electric power that is received from the external power supply 99.

When it is determined that printing can be performed with the electric powers indicated by the obtained electric power information, the CPU 51 decides, as the request electric power information, the electric power information indicating the voltage equal to or lower than the voltage of the assumed electric power information, in the first electric power information processing. There is an upper limit on the electric power that can be output at a time by the external power supply 99. The printing apparatus 1 does not receive the electric power of the voltage higher than the voltage of the assumed electric power information. Therefore, when the external power supply 99 is connected to the printing apparatus 1 and a device other than the printing apparatus 1, a situation where the voltage that is output to the printing apparatus 1 increases and thus the electric power that is output to the device other than the printing apparatus 1 decreases is suppressed.

When it is determined that printing cannot be performed with the electric powers indicated by the obtained electric power information (S2: NO), the CPU 51 decides, as the request electric power information, the electric power information indicating the minimum voltage, in the second electric power information processing (S31). There is an upper limit on the voltage that can be output at a time by the external power supply 99. Since the printing apparatus 1 receives the electric power of the minimum voltage, when the external power supply 99 is connected to the printing apparatus 1 and a device other than the printing apparatus 1, a situation where the voltage that is output to the printing apparatus 1 increases and thus the electric power that is output to the device other than the printing apparatus 1 decreases is suppressed.

The printing apparatus 1 includes the battery 71. When it is determined that printing cannot be performed with the electric powers indicated by the obtained electric power information (S2: NO), the CPU 51 charges the battery 71 (S41). In this case, the CPU 51 decides, as the request electric power information, the electric power information indicating the minimum voltage and the maximum electric power, in the second electric power information processing. In this way, when printing by the printing head 21 cannot be performed, the printing apparatus 1 can charge the battery 71 with the electric power received from the external power supply 99.

When it is determined that printing cannot be performed with the electric power indicated by the obtained electric power information (S2: NO), the CPU 51 executes the electric power shortage display processing to display and notify that that printing by the printing head 21 cannot be performed, on the display 6 (S43). Thereby, the user can perceive that the printing apparatus 1 cannot perform printing with the electric power supplied from the connected external power supply 99.

The print control values include the printing speed, the energization time, and the number of divisions. The CPU 51 controls the printing head 21 according to the printing speed, thereby energizing the heat generation region to perform printing on the printing medium. At this time, the CPU 51 energizes the heat generating elements in the heat generation region for the energization time and performs printing. The magnitude of the current that is supplied to the printing head 21 varies according to the number of divisions. In this case, since the printing apparatus 1 controls the printing head 21, based on the calculated printing speed, energization time, and number of divisions, the printing apparatus 1 can perform printing by sufficiently using the electric power that is received from the external power supply 99.

The printing apparatus 1 includes the USB connector 91 that is connected to the external power supply 99 with connection conforming to the USB PD standards. The printing head 21 is supplied with the electric power from the external power supply 99 via the USB connector 91. In this case, the printing apparatus 1 is connected to the external power supply 99 with connection conforming to the USB PD, which improves convenience.

In the above illustrative embodiment, the CPU 51 that executes the processing of S1 corresponds to the "first obtaining unit" of the present disclosure. The CPU 51 that executes the processing of S2 corresponds to the "determination unit" of the present disclosure. The CPU 51 that executes the processing of S11 corresponds to the "first decision unit" of the present disclosure. The CPU 51 that executes the processing of S13 corresponds to the "request unit" of the present disclosure. The CPU 51 that executes the processing of S12 corresponds to the "first calculation unit" of the present disclosure. The CPU 51 that executes the processing of S24 corresponds to the "print controller" of the present disclosure. The electric power indicated by the assumed electric power information corresponds to the "assumed electric power" of the present disclosure. The ROM 52 corresponds to the "electric power storage" of the present disclosure. The voltage indicated by the assumed electric power information corresponds to the "assumed voltage" of the present disclosure. The ROM 52 corresponds to the "voltage storage" of the present disclosure. The CPU 51 that executes the processing of S31 corresponds to the "second decision unit" of the present disclosure. The CPU 51 that executes the processing of S41 corresponds to the "charging controller" of the present disclosure. The CPU 51 that executes the processing of S43 corresponds to the "notification unit" of the present disclosure. The USB connector 91 corresponds to the "USB port" of the present disclosure.

The present invention is not limited to the above illustrative embodiment, and a variety of changes can be made without departing from the scope of the present invention. For example, following changes may be made as appropriate. The following changes may also be combined as appropriate.

Figure 7:
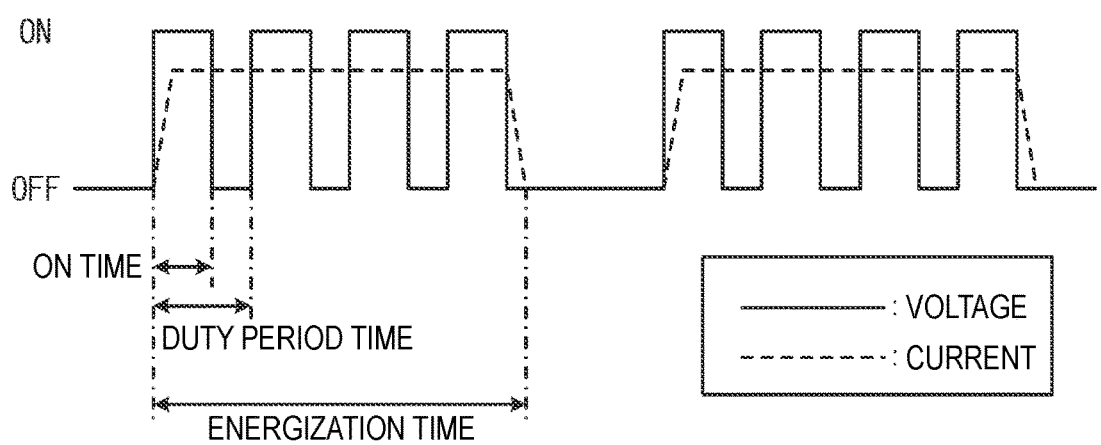
FIG. 7 depicts temporal change in voltage and current that are supplied to a printing head during printing.

The print control value may be a parameter for controlling the printing head 21 during printing. For example, the print control value may include a duty ratio. The CPU 51 applies a voltage pulse to the printing head 21 until the heat generating elements of the printing head 21 complete one dot printing (refer to FIG. 7). The duty ratio is a ratio of a time (ON time) in which a voltage is on in the voltage pulse to a period (a duty period time) of the voltage pulse.

The duty ratio when the electric power indicated by the request electric power information is received is expressed by an equation (4). The duty ratio when the electric power indicated by the request electric power information is received is derived by multiplying a ratio of the current indicated by the request electric power information to the current indicated by the assumed electric power information and a reference duty ratio. The reference duty ratio is a duty ratio when the electric power indicated by the assumed electric power information is received from the external power supply 99, and is stored in the ROM 52. In this case, the current indicated by the assumed electric power information corresponds to the "assumed current" of the present disclosure. The ROM 52 corresponds to the "current storage" of the present disclosure.

$$\text{Duty ratio} = (\text{reference Duty } raio) \times \frac{\text{current in request electric power information}}{\text{current in assumed electric power information}} \quad \text{Equation (4)}$$

In this way, the CPU 51 calculates the duty ratio, which is one of the print control values when the electric power indicated by the request electric power information is received, based on the ratio of the current indicated by the request electric power information to the current indicated by the assumed electric power information. For this reason, the printing apparatus 1 can perform printing by sufficiently using the electric power that is received from the external power supply 99.

When it is determined that printing can be performed with the electric power indicated by the obtained electric power information, the CPU 51 decides, as the request electric power information, the electric power information indicating current equal to or less than the current of the assumed electric power information, in the first electric power information processing. There is an upper limit on the electric power that can be output at a time by the external power supply 99. Since the printing apparatus 1 does not receive the electric power of the current larger than the current of the assumed electric power information, when the external power supply 99 is connected to the printing apparatus 1 and a device other than the printing apparatus 1, a situation where the current that is output to the printing apparatus 1 increases and thus the electric power that is output to the device other than the printing apparatus decreases is suppressed.

The print control value may be calculated based on the voltage, the current and the electric power indicated by one electric power information or may be calculated based on the voltages, the currents and the electric powers indicated by three or greater electric power information. For example, the printing speed that is the print control value may be calculated based on the electric power indicated by the request electric power information. In this case, the printing speed when the electric power indicated by the request electric power information is received is expressed by an equation (5). The printing speed is derived by multiplying the electric power indicated by the request electric power information and a fixed value. The fixed value is based on a width (mm) of one dot printing printed by the heat generating elements of the printing head 21, electric power (W·s/number of dots) required for one dot printing, and a resolution (number of dots). All of the width of one dot printing printed by the heat generating elements of the printing head 21, the electric power required for one dot printing, and the resolution are predetermined values depending on a characteristic of the printing head 21.

$$\text{printing speed} = \frac{(\text{electric power in request electric power information}) \times \text{width of one dot}}{(\text{electric power required for one dot printing}) \times (\text{resolution})} \quad \text{Equation (5)}$$

In this way, the CPU 51 calculates the print control value when the electric power indicated by the request electric power information is supplied from the external power supply 99, based on at least one of the electric power, the voltage and the current indicated by the request electric power information and the fixed value depending on the characteristic of the printing head 21. For this reason, the printing apparatus 1 can perform printing by sufficiently using the electric power that is received from the external power supply 99. The fixed value may also be a value based on an inherent value (for example, a width of the printing medium, and the like) depending on a characteristic of the printing medium.

In this way, the printing apparatus 1 calculates the print control value when the electric power indicated by the request electric power information is supplied, based on at least one of the electric power, the voltage and the current indicated by the request electric power information and the fixed value depending on the characteristic of at least one of the printing head 21 and the printing medium. For this reason, the printing apparatus 1 can perform printing by sufficiently using the electric power that is received from the external power supply 99.

When the printing cannot be performed with the electric powers indicated by the electric power information of the external power supply 99, the CPU 51 may calculate a charging control value for controlling charging of the battery 71 when the electric power indicated by the request electric power information is supplied. The charging control value is, for example, a charging current. The CPU 51 obtains the plurality of electric power information from the external power supply 99 (S1). The CPU 51 decides the request electric power information from the obtained plurality of electric power information (S31), and requests the external power supply 99 to output the electric power indicated by the request electric power information (S33). The charging current that is the charging control value when the electric power indicated by the request electric power information is received is expressed by an equation (6) or (7).

$$\text{charging current} = \frac{\text{electric power in request electric power information}}{5[V]} \quad \text{Equation (6)}$$

$$\text{charging current} = (\text{electric power in request electric power information}) \times (\text{voltage conversion constant}) \quad \text{Equation (7)}$$

In the equation (6), the charging current is derived by the voltage (5V) indicated by the request electric power information for the electric power indicated by the request electric power information. In the equation (7), the charging current is derived by multiplication of the electric power indicated by the request electric power information and the voltage conversion constant. The voltage conversion constant is a predetermined value relating to conversion of a voltage for charging of the battery 71 in the charging circuit 61. In this case, the CPU 51 that executes the processing of S1 corresponds to the "second obtaining unit" of the present disclosure. The CPU 51 that calculates the charging control value corresponds to the "second calculation unit" of the present disclosure. The processing of obtaining the plurality of electric power information from the external power supply 99 may be executed in processing different from the processing of S1. In this case, the CPU 51 that executes the processing of obtaining the plurality of electric power information from the external power supply 99 corresponds to the "second obtaining unit" of the present disclosure.

In this way, the CPU 51 calculates the charging control value corresponding to the electric power indicated by the request electric power information, and controls the charging of the battery 71. For this reason, the printing apparatus 1 can charge the battery 71 by sufficiently using the electric power that is received from the external power supply 99.

The present disclosure can be further diversely changed. The configuration and number of the printing apparatus 1 may also be changed as appropriate. The USB PD controller 80 may be a single hardware body or may include software. For example, the USB PD controller 80 may include a CPU, and some of the main processing may be executed by the CPU of the USB PD controller 80. The first line 36, the second line 37 and the third line 38 may be provided with switches different from the FETs 32, 34 and 62. The FETs 32, 34 and 62 are not limited to the switching elements, and may be each a relay switch, for example.

In the above illustrative embodiment, the printing apparatus 1 is connected to the external power supply 99 with the connection conforming to the USB PD standards. However, the present disclosure is not limited thereto. For example, the printing apparatus 1 may be connected to the external power supply 99 with connection conforming to USB BC (USB Battery Charge) or connection other than the USB standards. When the printing apparatus 1 is connected to the external power supply 99 with connection other than the USB standards, the printing apparatus 1 may not include the USB connector 91.

Each processing of the printing apparatus 1 is not limited to the example where it is executed by the CPU 51. For example, some or all of the processing may be executed by another electronic device (for example, ASIC). Each processing of the printing apparatus 1 may be executed in a distributed manner by a plurality of electronic devices (for example, a plurality of CPUs). For example, some of the first electric power information processing may be executed by a CPU different from the CPU 51.

The program including a command for causing the CPU 51 to execute processing may be stored in the storage device of the apparatus until the CPU 51 executes the program. Therefore, an obtaining method and an obtaining route of the program and the device in which the program is stored may be changed as appropriate. The program that is executed in the printing apparatus 1 may be received from another apparatus via a cable or wireless communication, and may be stored in a storage device such as the flash memory 54. Another apparatus includes a PC and a server connected via a network.

The steps of each processing of the printing apparatus 1 may be changed in order, omitted or added, as required. An aspect where an operating system (OS) and the like operating on the printing apparatus 1 performs some or all of the processing based on commands from the CPU 51 of the printing apparatus 1 is also included within the scope of the present disclosure.

When it is determined that printing can be performed with the electric powers indicated by the obtained electric power information (S2: YES), the battery 71 may not be charged. In this case, the CPU 51 may omit the processing of S21 and S23. The electric power shortage display processing may be an LED light emission, a buzzer notification and the like, instead of the display on the display 6.

As discussed above, the present disclosure may provide at least the following illustrative, non-limiting aspects.

The printing apparatus may further include: an electric power storage storing assumed electric power, the assumed electric power being required to be assumed in a case of performing the printing by the printing head with a predetermined print control value. In the calculating of the print control value, the controller may be configured to calculate the print control value based on a ratio of the electric power indicated by the request electric power information and the assumed electric power stored in the electric power storage. In this case, the printing apparatus calculates the print control value when the electric power indicated by the request electric power information is supplied, based on the ratio of the assumed electric power, which is assumed required for printing with the predetermined print control value, and the electric power indicated by the request electric power information. For this reason, the printing apparatus can perform printing by sufficiently using the electric power received from the external power supply.

In the deciding of the request electric power information, the controller may be configured to decide, as the request electric power information, the electric power information indicating maximum possible electric power, the maximum possible electric power being maximum electric power of the possible electric powers and being equal to or less than the assumed electric power. There is an upper limit on the electric power that can be output at a time by the external power supply. The printing apparatus does not perform printing by receiving electric power greater than the assumed electric power. Therefore, when the external power supply is connected to the printing apparatus and a device other than the printing apparatus, a situation where the electric power that is output to the printing apparatus increases and thus the electric power that is output to the device other than the printing apparatus decreases is suppressed.

The electric power information may further include information of a current that can be output, the printing apparatus may further include a current storage storing an assumed current, the assumed current being required to be assumed required in a case of performing the printing by the printing head with the predetermined print control value, and in the calculating of the print control value, the controller may be configured to calculate the print control value based on a ratio of a current indicated by the request electric power information and the assumed current stored in the current storage. In this case, the printing apparatus calculates the print control value when the electric power indicated by the request electric power information is supplied, based on the ratio of the assumed current, which is assumed required for printing with the predetermined print control value, and the current indicated by the request electric power information. For this reason, the printing apparatus can perform printing by sufficiently using the electric power received from the external power supply.

In the deciding of the request electric power information, the controller may be configured to decide, as the request electric power information, any one of the electric power information indicating possible currents, the possible currents being determined in the determining that the printing by the printing head can be performed and being equal to or smaller than the assumed current. There is an upper limit on the electric power that can be output at a time by the external power supply. The printing apparatus does not perform printing by receiving electric power of current larger than the assumed current. Therefore, when the external power supply is connected to the printing apparatus and a device other than the printing apparatus, a situation where the current that is output to the printing apparatus increases and thus the electric power that is output to the device other than the printing apparatus decreases is suppressed.

The electric power information may further include information of a voltage that can be output, the printing apparatus may further include a voltage storage storing an assumed voltage, the assumed voltage being required to be assumed in a case of performing the printing by the printing head with the predetermined print control value, and in the calculating of the print control value, the controller may be configured to calculate the print control value based on a ratio of a voltage indicated by the request electric power information and the assumed voltage stored in the voltage storage. In this case, the printing apparatus calculates the print control value when the electric power indicated by the request electric power information is supplied, based on the ratio of the assumed voltage, which is assumed required for printing with the predetermined print control value, and the voltage indicated by the request electric power information. For this reason, the printing apparatus can perform printing by sufficiently using the electric power received from the external power supply.

In the deciding of the request power information, the controller may be configured to decide, as the request electric power information, any one of the electric power information indicating possible voltages, the possible voltage being determined in the determining that the printing by the printing head can be performed and being equal to or lower than the assumed voltage. There is an upper limit on the electric power that can be output at a time by the external power supply. The printing apparatus does not perform printing by receiving the electric power of a voltage higher than the assumed voltage. Therefore, when the external power supply is connected to the printing apparatus and a device other than the printing apparatus, a situation where the voltage that is output to the printing apparatus increases and thus the electric power that is output to the device other than the printing apparatus decreases is suppressed.

The electric power information may further include information of a voltage and a current that can be output, and in the calculating of the print control value, the controller may be configured to calculate the print control value based on: at least one of the electric power, a voltage, and a current indicated by the request electric power information; and a predetermined fixed value depending on a characteristic of at least one of the printing head and the printing medium. In this case, the printing apparatus calculates the print control value when the electric power indicated by the request electric power information is supplied, based on at least one of the electric power, the voltage and the current indicated by the request electric power information and the fixed value depending on the characteristic of at least one of the printing head and the printing medium. For this reason, the printing apparatus can perform printing by sufficiently using the electric power received from the external power supply.

The electric power information may further include information of a voltage that can be output, and in a case it is determined that the printing by the printing head cannot be performed for all of the plurality of electric power information obtained, the controller may be configured to further decide, as the request electric power information, the electric power information indicating a minimum voltage of the plurality of electric power information. When the printing by the printing head cannot be performed, the printing apparatus receives the minimum voltage from the external power supply. Therefore, even when a device different from the printing apparatus is further connected to the external power supply, the printing apparatus can suppress the electric power that is supplied to the device different from the printing apparatus from decreasing.

The printing apparatus may further include a battery chargeable by the electric power supplied from the external power supply. The controller may be further configured to charge the battery in a case the electric power indicated by the request electric power information decided in the further deciding is supplied from the external power supply. In the further deciding, the controller may be configured to decide, as the request electric power information, the electric power information indicating a maximum electric power from the plurality of electric power information indicating the minimum voltage. Thereby, when the printing by the printing head cannot be performed, the printing apparatus can charge the battery with the electric power received from the external power supply.

The electric power information may further include information of a current that can be output, and the controller may be further configured to: obtain at least one of electric powers and currents indicated by the plurality of electric power information, and calculate a charging control value for controlling charging of the battery on a condition that the electric power indicated by the request electric power information is supplied from the external power supply, based on: at least one of the obtained electric powers and the obtained currents indicated by the electric power information; and the request electric power information decided by the further deciding. In this case, the printing apparatus calculates the charging control value corresponding to the request electric power information indicative of the electric power received from the external power supply. For this reason, the printing apparatus can charge the battery by sufficiently using the electric power received from the external power supply.

In a case it is determined that the printing by the printing head cannot be performed for all of the plurality of electric power information obtained, the controller may be configured to notify that the printing by the printing head cannot be performed. In this way, when the printing by the printing head cannot be performed, the printing apparatus notifies that the printing cannot be executed. Thereby, a user can perceive that the printing apparatus cannot execute printing with the electric power supplied from the connected external power supply.

The print control value may include at least one of: a control value of the printing head relating to a printing speed; a control value relating to a magnitude of a current that is energized to the printing head; and a control value relating to a time for which the printing head is energized at a time. In this case, since the printing apparatus controls the printing head, based on the calculated print control value, the printing apparatus can perform printing by sufficiently using the electric power received from the external power supply.

The printing apparatus may further include a Universal Serial Bus (USB) port connectable to the external power supply with connection according to Universal Serial Bus Power Delivery (USB PD) standards. The printing head may be supplied with the electric power from the external power supply via the USB port. In this case, the printing apparatus is connected to the external power supply with connection conforming to USB PD, which improves convenience.

What is claimed is:

1. A printing apparatus connectable to an external power supply, the external power supply having a plurality of electric power information each indicating electric power that can be output, the printing apparatus comprising:
   a printing head configured to perform printing on a printing medium by electric power that is supplied from the external power supply; and
   a controller configured to:
      obtain the plurality of electric power information of the external power supply;
      determine whether the printing by the printing head can be performed on a condition that electric power indicated by the obtained electric power information is supplied from the external power supply;
      decide, as request electric power information, any one of the electric power information indicating possible electric powers, the possible electric powers being determined in the determining that the printing by the printing head can be performed;
      request the external power supply to output electric power indicated by the request electric power information;
      calculate a print control value based on the decided request electric power information, the print control value being for controlling the printing head on a condition that the electric power indicated by the request electric power information is supplied from the external power supply; and
      control the printing head to perform the printing based on the calculated print control value.

2. The printing apparatus according to claim 1, further comprising:
   an electric power storage storing assumed electric power, the assumed electric power being required to be assumed in a case of performing the printing by the printing head with a predetermined print control value,
   wherein in the calculating of the print control value, the controller is configured to calculate the print control value based on a ratio of the electric power indicated by the request electric power information and the assumed electric power stored in the electric power storage.

3. The printing apparatus according to claim 2, wherein in the deciding of the request electric power information, the controller is configured to decide, as the request electric power information, the electric power information indicating maximum possible electric power, the maximum possible electric power being maximum electric power of the possible electric powers and being equal to or less than the assumed electric power.

4. The printing apparatus according to claim 1,
wherein the electric power information further comprises information of a current that can be output,
wherein the printing apparatus further comprises a current storage storing an assumed current, the assumed current being required to be assumed in a case of performing the printing by the printing head with a predetermined print control value, and
wherein in the calculating of the print control value, the controller is configured to calculate the print control value based on a ratio of a current indicated by the request electric power information and the assumed current stored in the current storage.

5. The printing apparatus according to claim 4, wherein in the deciding of the request electric power information, the controller is configured to decide, as the request electric power information, any one of the electric power information indicating possible currents, the possible currents being determined in the determining that the printing by the printing head can be performed and being equal to or smaller than the assumed current.

6. The printing apparatus according to claim 1,
wherein the electric power information further comprises information of a voltage that can be output,
wherein the printing apparatus further comprises a voltage storage storing an assumed voltage, the assumed voltage being required to be assumed in a case of performing the printing by the printing head with a predetermined print control value, and
wherein in the calculating of the print control value, the controller is configured to calculate the print control value based on a ratio of a voltage indicated by the request electric power information and the assumed voltage stored in the voltage storage.

7. The printing apparatus according to claim 6, wherein in the deciding of the request electric power information, the controller is configured to decide, as the request electric power information, any one of the electric power information indicating possible voltages, the possible voltages being determined in the determining that the printing by the printing head can be performed and being equal to or lower than the assumed voltage.

8. The printing apparatus according to claim 1,
wherein the electric power information further comprises information of a voltage and a current that can be output, and
wherein in the calculating of the print control value, the controller is configured to calculate the print control value based on:
at least one of the electric power, the voltage, and the current indicated by the request electric power information; and
a predetermined fixed value depending on a characteristic of at least one of the printing head and the printing medium.

9. The printing apparatus according to claim 1,
wherein the electric power information further comprises information of a voltage that can be output, and
wherein in a case it is determined that the printing by the printing head cannot be performed for all of the plurality of electric power information obtained, the controller is configured to further decide, as the request electric power information, the electric power information indicating a minimum voltage of the plurality of electric power information.

10. The printing apparatus according to claim 9, further comprising:
a battery chargeable by the electric power supplied from the external power supply,
wherein the controller is further configured to charge the battery in a case the electric power indicated by the request electric power information decided in the further deciding is supplied from the external power supply, and
wherein in the further deciding, the controller is configured to decide, as the request electric power information, the electric power information indicating a maximum electric power from the plurality of electric power information indicating the minimum voltage.

11. The printing apparatus according to claim 10,
wherein the electric power information further comprises information of a current that can be output, and
wherein the controller is further configured to:
obtain at least one of electric powers and currents indicated by the plurality of electric power information, and
calculate a charging control value for controlling charging of the battery on a condition that the electric power indicated by the request electric power information is supplied from the external power supply, based on:
at least one of the obtained electric powers and the obtained currents indicated by the electric power information; and
the request electric power information decided by the further deciding.

12. The printing apparatus according to claim 1, wherein in a case it is determined that the printing by the printing head cannot be performed for all of the plurality of electric power information obtained, the controller is configured to notify that the printing by the printing head cannot be performed.

13. The printing apparatus according to claim 1, wherein the print control value comprises at least one of:
a control value of the printing head relating to a printing speed;
a control value relating to a magnitude of a current that is energized to the printing head; and
a control value relating to a time for which the printing head is energized at a time.

14. The printing apparatus according to claim 1, further comprising:
a Universal Serial Bus port connectable to the external power supply with connection according to Universal Serial Bus Power Delivery standards,
wherein the printing head is supplied with the electric power from the external power supply via the Universal Serial Bus port.

* * * * *